United States Patent Office 3,123,625
Patented Mar. 3, 1964

3,123,625
ACYLTHIO HALOGENO OCTANOIC ACID DERIVATIVES
Masao Ohara, Ibaraki, Raitaro Haraoka, Osaka, Yoshio Deguchi, Suita, and Kazuko Miura and Masumi Ito, Osaka, Japan, assignors to Fujisawa Pharmaceutical Co., Ltd., Osaka, Japan, a company of Japan
No Drawing. Filed Jan. 29, 1962, Ser. No. 169,596
Claims priority, application Japan Feb. 2, 1961
11 Claims. (Cl. 260—399)

This invention relates to novel compounds and to processes for preparing same. More particularly, this invention is concerned with acylthio halogen octanoic acid compounds of the formula

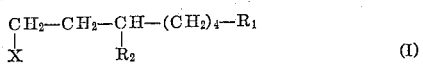

wherein X is halogen, $R_1$ is carboxyl radical or a radical capable of producing carboxyl radical on hydrolysis and $R_2$ is an acylthio radical.

It is an object of this invention to provide novel and useful compounds which are especially important as key intermediates in preparation of disulfide compounds of thioctic acid derivatives with vitamin $B_1$ or its homologues, e.g. thiamine-8-(methyl 6-acetyl dihydrothioctate) disulfide of the formula

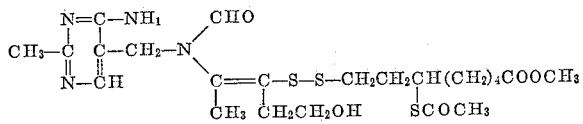

its other lower alkyl ester, free acid, acid amide and so forth.

It is also an object to provide processes for preparing same. Further objects will appear hereinafter.

Thiamine-8-(methyl 6-acetyl dihydrothioctate) disulfide and its homologues are compounds having both activities of thioctic acid and vitamin $B_1$. It has been known that both thioctic acid and vitamin $B_1$ are closely concerned as a coenzyme in the oxidative decarboxylation of α-keto acids. In view of the above fact, intensive investigations have been undertaken into elucidation of the binding form of both in which maximum utilization of both can be expected in the living system and, as a result, the new compounds have been synthesized.

A distinctive structural feature of the above disulfides is the use of 6-acetylthiooctanoic acid derivatives as the thioctic acid component.

From the results of fundamental and clinical experiments, it has become clear that the larger the doses administered of the above disulfides, the greater is the absorption in the body so that they are transferred into the blood cells and other tissues of internal organs rapidly. Then it seems that the SS-linkage is split to form thioctic acid and vitamin $B_1$. In consequence, the disulfides are better absorbed by the intestines, act more favorably in the oxidative decarboxylation of α-keto acids and utilized more efficiently in the living system than when thioctic acid and vitamin $B_1$ are jointly used.

Further, thioctic acid and vitamin $B_1$ are difficult to use in a mixed solution for injection, because thioctic acid is stable only in an alkaline medium and vitamin $B_1$ in an acid medium. The disulfides make possible the administration of them in an injection form, too.

The process of this invention comprises reacting 8-halogenooctanoic acid derivative having an organic sulfonyloxy at 6-position of the formula

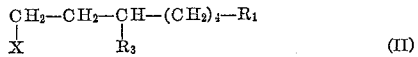

wherein $R_3$ is organic sulfonyloxy radical, and X and $R_1$ are the same as described above, which is prepared by the reaction of 6-hydroxy-8-halogenooctanoic acid or its acid derivative with an organic sulfonyl halide such as methane sulfonyl halide, ethane sulfonyl halide, benzene sulfonyl halide, toluene sulfonyl halide, etc. with a mono thiocarboxylic acid in the presence of an alkaline agent to produce 6-acylthio-8-halogenooctanoic acid or its acid derivative of the Formula I.

Esters and amides of carboxylic acid are included in a radical capable of producing carboxyl radical on hydrolysis, e.g. carbo (lower) alkoxy and carboxamide, in this invention. A few examples of organic sulfonyloxy radical are methane sulfonyloxy, ethane sulfonyloxy, benzene sulfonyloxy, toluene sulfonyloxy, etc.

As mono thiocarboxylic acid, thioformic acid, thioacetic acid, thiopropionic acid, thiobenzoic acid, phenyl thioacetic acid, and so forth may be used in this invention. The reaction may be carried out with or without solvent. Any inert solvent which has no effect on the reaction such as acetone, methyl ethyl ketone, dioxane, tetrohydrofuran, etc. may be used.

In the case the raw material (II) remains in some quantity in the reaction mixture, it gives some bad influence on purification of the product (I) obtained. To avoid this, it may be preferable to use an excess amount of thiocarboxylic acid over that corresponding to the raw material in the reaction.

The reaction is conducted in the presence of an alkaline agent such as alkali metal hydroxide, alkaline earth metal hydroxide, alkyl or aryl amines, and pyridine. One of the most preferable ones, however, may be alkaline earth metal hydroxide, for instance, calcium hydroxide. If a salt of thiocarboxylic acid is used instead of the thiocarboxylic acid, then the alkaline agent is not needed. The alkaline agent or the salt cation acts as acceptor of the byproduct, organic sulfonic acid.

The reaction proceeds under any of anhydrous or hydrous conditions. If too much water is included in the reaction system, however, the reaction mixture may be liable to be decomposed. The reaction may be preferably effected under moderate heating on water bath or under reflux when solvent is used.

Though both radicals, sulfonyloxy and halogen, in the raw material (II) are reactive, the former may react specifically with thiocarboxylic acid to produce the novel and useful product having reactive halogen at ω-position (I) in this invention.

The following examples illustrate the present invention without, however, limiting the same thereto.

*Example 1*

16.0 g. of p-toluene sulfonyl chloride are dissolved in 30 cc. of pyridine. A solution of 13.5 g. of methyl 6-hydroxy-8-chlorooctanoate in 20 cc. of pyridine is added drop by drop to the solution keeping at about 0° C. under stirring. The mixture is allowed to stand overnight and poured into ice water. The oil isolated is extracted with chloroform and the extract is washed with water and then dilute sulfuric acid and dried. The solvent is removed yielding 19.0 g. of methyl 6-(p-tosyloxy)-8-chlorooctanoate. 12.2 g. of methyl 6-(p-tosyloxy)-8-chlorooctanoate thus obtained and 5.1 g. of thioacetic acid are dissolved in 200 cc. of acetone. 8.0 g. of anhydrous barium hydroxide are added to the solution and the mixture is heated for thirteen hours under reflux. Crystals precipitated are removed by filtration and the mixture is condensed under reduced pressure. To the oil produced is added water and the mixture is extracted with benzene and dried. The benzene is removed and residue is distilled in vacuo yielding 5.0 g. of methyl 6-acetylthio-8-chlorooctanoate, slightly yellow oil, at B.P.$_{0.1}$ 135–141° C.

I.R.: 2940, 1737, 1692, 1435, 1245, 1195, 1170, 1132, 950 cm.$^{-1}$.

*Analysis.*—Calculated for $C_{11}H_{19}O_3SCl$: C, 49.52; H, 7.18; S, 12.02; Cl, 13.29. Found: C, 49.83; H, 7.33; S, 11.65; Cl, 13.31.

*Example 2*

9.0 g. of methyl 6-(p-tosyloxy)-8-chlorooctanoate, prepared according to the method of Example 1, and 3.8 g. of thioacetic acid are dissolved in 200 cc. of methyl ethyl ketone. To the solution are added 2.5 g. of calcium hydroxide, and the mixture is heated for fifteen hours under reflux. Crystals precipitated are removed by filtration and the mixture is condensed under reduced pressure. To the oil produced is added water and the mixture is extracted with benzene and dried. The benzene is removed and residue is distilled yielding 4.8 g. of methyl 6-acetylthio-8-chlorooctanoate, slightly yellow oil, at B.P.$_{0.1}$ 133–138° C.

*Example 3*

25.0 g. of methyl 6-(p-tosyloxy)-8-chlorooctanoate, prepared according to the method of Example 1, and 19.0 g. of thiobenzoic acid are dissolved in 400 c. of acetone. To the solution are added 5.6 g. of calcium hydroxide, and the mixture is heated for nine hours under reflux and condensed under reduced pressure. Water is added to the residue and the mixture is extracted with benzene and dried. The benzene is removed and residue is distilled yielding 11.0 g. of methyl 6-benzoylthio-8-chlorooctanoate, orange-yellow oil, at B.P.$_{0.15}$ 169–175° C.

*Analysis.*—Calculated for $C_{16}H_{21}O_3SCl$: C, 58.46; H, 6.38; S, 9.75; Cl, 10.79. Found: C, 58.72; H, 6.49; S, 9.61; Cl, 10.41.

*Example 4*

33.0 g. of methane sulfonyl chloride are dissolved in 46.0 g. of pyridine. A solution of 40.0 g. of methyl 6-hydroxy-8-chlorooctanoate in 120 cc. of chloroform is added drop by drop to the solution keeping at about 0° C. under stirring. The mixture is allowed to stand overnight. The mixture is poured into ice water. The chloroform layer is washed with water and then dilute sulfuric acid and dried. The solvent is removed yielding 52.0 g. of methyl 6-methyl-sulfonyloxy-8-chlorooctanoate.

*Analysis.*—Calculated for $C_{10}H_{19}O_5SCl$: C, 41.88; H, 6.67; S, 11.17; Cl, 12.36. Found: C, 41.94; H, 6.60; S, 10.73; Cl, 12.86.

20.0 g. of methyl 6-methylsulfonyloxy-8-chlorooctanoate thus obtained and 10.6 g. of thioacetic acid are dissolved in 270 cc. of acetone. To the solution are added 5.7 g. of calcium hydroxide and the mixture is heated for ten hours under stirring. Crystals precipitated are removed by filtration and the mixture is condensed under reduced pressure. To the oil produced is added water and the mixture is extracted with benzene and dried. The benzene is removed and residue is distilled in vacuo yielding 14.0 g. of methyl 6-acetylthio-8-chlorooctanoate at B.P.$_{0.1}$ 135–143° C.

*Example 5*

4.6 g. of thioacetic acid in 25 cc. of ethanol are neutralized with 10% ethanol solution of potassium hydroxide in the presence of an indicator, phenolphthalein and the mixture is condensed to dryness obtaining potassium thioacetate. 20.0 g. of methyl 6-(p-tosyloxy)-8-chlorooctanoate, prepared according to the method of Example 1, and the potassium thioacetate obtained as above are suspended in 270 cc. of acetone and the mixture is heated for twelve hours under reflux. The acetone is removed under reduced pressure and to the residue is added water. The mixture is extracted with benzene and dried. The benzene is removed and the residue is distilled in vacuo gathering a portion of oil obtaining below B.P.$_{0.1}$ 140° C. The portion thus obtained is distilled again yielding 4.0 g. of methyl 6-acetylthio-8-chlorooctanoate at B.P.$_{0.1}$ 134–140° C.

*Example 6*

20.0 g. of methyl 6-(p-tosyloxy)-8-chlorooctanoate, prepared according to the method of Example 1, and 8.4 g. of thioacetic acid and 6.1 g. of triethylamine are dissolved in 200 cc. of acetone. The solution is heated for twenty hours under reflux. The acetone is removed under reduced pressure and to the residue is added water. The mixture is extracted with benzene. The benzene layer is washed with dilute sulfuric acid and with water, and dried. 3.2 g. of methyl 6-acetylthio-8-chlorooctanoate are obtained according to the method of purification of Example 5. 6-(p-tosyloxy)-8-chlorooctanoic acid is treated according to the method of Example 3 to produce 6-acetylthio-8-chlorooctanoic acid, oily substance, distilled at B.P.$_{0.2-0.5}$ 150–160° C. This compound is also produced according to the method of Example 6 from the same raw material.

We claim:

1. A compound of the formula

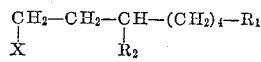

wherein X is a halogen, $R_1$ is a radical selected from the group consisting of carboxy radicals and esters and amides of carboxylic acids capable of producing carboxyl radicals on hydrolysis and $R_2$ is a carboxylic acylthio radical.

2. Methyl 6-acetylthio-8-chlorooctanoate.
3. Methyl 6-benzoylthio-8-chlorooctanoate.
4. 6-acetylthio-8-chlorooctanoic acid.
5. 6-acetylthio-8-chlorooctanamide.
6. A process for the production of a 6-carboxylic acylthio-8-halogeno octanoic acid derivative comprising reacting a compound of the formula

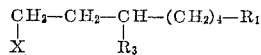

with a mono thiocarboxylic acid in the presence of an alkaline agent, wherein X is a halogen, $R_1$ is a radical selected from the group consisting of carboxyl radicals and esters and amides of carboxylic acids capable of producing carboxyl radicals on hydrolysis, and $R_3$ is an organic sulfonyloxy radical.

7. The process of claim 6 wherein said alkaline agent is an alkaline earth metal hydroxide.

8. The process of claim 6 wherein said alkaline agent is calcium hydroxide.

9. The process of claim 6 wherein said organic sulfonyloxy radical is selected from the radical consisting of methane sulfonyloxy, ethane sulfonyloxy, benzene sulfonyloxy and toluene sulfonyloxy.

10. The process of claim 6 wherein said mono thiocarboxylic acid is selected from the group consisting of thioacetic acid and thiobenzoic acid.

11. A process for the production of a 6-carboxylic acylthio-8-halogeno octanoic acid derivative comprising reacting a compound of the formula

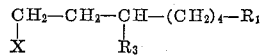

with a metal salt of mono thiocarboxylic acid wherein X is a halogen, $R_1$ is a radical selected from the group consisting of carboxyl esters and amides of carboxylic acids and radicals capable of producing carboxyl radicals on hydrolysis, and $R_3$ is an organic sulfonyloxy radical.

No references cited.

UNITED STATES PATENT OFFICE
CERTIFICATE OF CORRECTION

Patent No. 3,123,625                      March 3, 1964

Masao Ohara et al.

It is hereby certified that error appears in the above numbered patent requiring correction and that the said Letters Patent should read as corrected below.

Column 1, line 13, for "halogen" read -- halogeno --; lines 27 to 31, for the upper left-hand portion of the formula reading column 2, line 20, for "tetrohydro-" read -- tetrahydro- --; column 3, line 23, for "400 c." read -- 400 cc.--; column 4, line 30, for "carboxy radicals" read -- carboxyl radical --; lines 31 and 32, 45, and 47, for "radicals", each occurrence, read -- radical --; line 68, after "carboxyl" insert -- radical and --; same column 4, line 69, for "and radicals capable of producing carboxyl radicals on" read -- capable of producing carboxyl radical on --.

Signed and sealed this 24th day of November 1964.

(SEAL)
Attest:

ERNEST W. SWIDER                          EDWARD J. BRENNER
Attesting Officer                       Commissioner of Patents